United States Patent
Balasubramanian

(10) Patent No.: US 8,930,657 B2
(45) Date of Patent: Jan. 6, 2015

(54) METHOD AND APPARATUS FOR REALTIME DETECTION OF HEAP MEMORY CORRUPTION BY BUFFER OVERRUNS

(75) Inventor: Prakash Kalanjeri Balasubramanian, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 430 days.

(21) Appl. No.: 13/184,999

(22) Filed: Jul. 18, 2011

(65) Prior Publication Data

US 2013/0024631 A1    Jan. 24, 2013

(51) Int. Cl.
*G06F 12/00* (2006.01)
*G06F 13/00* (2006.01)
*G06F 12/14* (2006.01)
*G06F 9/30* (2006.01)
*G06F 12/02* (2006.01)

(52) U.S. Cl.
CPC .............. *G06F 12/1441* (2013.01); *G06F 9/30* (2013.01); *G06F 12/023* (2013.01)
USPC ........... 711/163; 711/152; 711/154; 711/145; 711/214; 711/E12.091; 711/E12.098; 711/E12.099

(58) Field of Classification Search
USPC .......... 711/163, 152, 154, 145, 214, E12.001, 711/E12.091, E12.098, E12.099
See application file for complete search history.

(56) References Cited

U.S. PATENT DOCUMENTS

| | | |
|---|---|---|
| 4,751,667 A | 6/1988 | Ross |
| 6,578,094 B1 | 6/2003 | Moudgill |
| 6,769,116 B1 | 7/2004 | Sexton |
| 7,086,088 B2 | 8/2006 | Narayanan |
| 7,272,748 B1 | 9/2007 | Conover et al. |
| 7,334,112 B2 | 2/2008 | Zahir et al. |
| 7,380,245 B1 | 5/2008 | Lovette |
| 7,631,249 B2 | 12/2009 | Borde et al. |
| 8,104,021 B2 | 1/2012 | Erlingsson et al. |
| 2007/0285271 A1 | 12/2007 | Erlingsson et al. |
| 2008/0148399 A1 | 6/2008 | Winkler |

OTHER PUBLICATIONS

ARM 7TDMI Data Sheet. Chapter 8. 31 Pages.
U.S. Appl. No. 13/453,136, filed Apr. 23, 2012.
Office Action Dated May 5, 2014 U.S. Appl. No. 13/453,136.
Final Office Action Dated Sep. 18, 2014 U.S. Appl. No. 13/453,136.

*Primary Examiner* — Midys Rojas
(74) *Attorney, Agent, or Firm* — Eschweiler & Associates, LLC

(57) ABSTRACT

One embodiment of the present invention relates to a heap overflow detection system that includes an arithmetic logic unit, a datapath, and address violation detection logic. The arithmetic logic unit is configured to receive an instruction having an opcode and an operand and to generate a final address and to generate a compare signal on the opcode indicating a heap memory access related instruction. The datapath is configured to provide the opcode and the operand to the arithmetic logic unit. The address violation detection logic determines whether a heap memory access is a violation according to the operand and the final address on receiving the compare signal from the arithmetic logic unit.

20 Claims, 11 Drawing Sheets

Char *Buffer = malloc(20); /* Dynamically allocate 20 byte buffer from heap */

*(Buffer + 15) = 0x25;

*(Buffer + 42) = 0x35; /* Buffer overrun case, will lead to corruption of adjacent blocks */

FIG. 1A

LDR  r0, [pc,offset] ; Results in address of variable Buffer in stored in register r0

LDR  r1, [r0]        ; Results in contents of Buffer variable stored in register r1

MOV r2, 0x25         ; Results in integer 0x25 stored in register r2

STR  r2, [r1, 15]    ; Results in 0x25 moved to an offset of 15 from address stored in register r1

MOV r2, 0x35         ; Results in integer 0x35 stored in register r2

STR  r2, [r1, 42]    ; Results in 0x35 moved to an offset of 42 from address stored in register r1

FIG. 1B

Char *Buffer = malloc(20); /* Dynamically allocate 20 byte buffer from heap */

Buffer = Buffer + 35; /* Wrong Pointer manipulation leading to a future violation */

FIG. 1C

LDR  r0, [pc,offset1] ; Results in address of variable Buffer stored in register r0

LDR  r1, [r0]        ; Results in contents of variable Buffer stored in register r1

ADD.A  r1, #35   ; Results in a bad update of Buffer variable leading to future violations STR  r1, [r0]        ; Results in Update to contents of Buffer variable

FIG. 1D

METHOD AND APPARATUS FOR REALTIME DETECTION OF HEAP MEMORY CORRUPTION BY BUFFER OVERRUNS

BACKGROUND OF THE INVENTION

Memory is prevalent in computer systems and electronic devices. Memory is used to store information, contain programs, records and the like. The integrity of the memory is important for operation of the systems and/or devices associated with it.

Corruption of memory occurs when expected or actual memory contents are erroneously modified. Memory can become corrupted through a variety of mechanisms. Once there is memory corruption, data can be lost, program contents can be modified, systems can become non-operable, and the like.

Physical memory is the hardware based memory that is written to and read from during normal operation. Corruption of physical memory can occur from a variety of sources, such as defective memory, RF interference, and the like. A variety of techniques exist for identifying corruption of physical memory. One example is parity checking, where a parity bit is set upon a write operation and the bit is checked during a read. If the parity bit doesn't match the data, data corruption may have occurred. Additionally, debug logic can configure a watchpoint on a memory location to verify proper read/write access to the memory location. Any errors would result in debug logic and create an alert to allow appropriate corrective action to be taken.

Heap memory, also referred to as dynamic memory, is memory that is allocated during run time of a program. After execution of the program, the allocated memory is returned to a memory pool. The heap memory can be corrupted by programming errors, such as buffer overflows. For example, data written beyond the bounds of allocated memory can corrupt adjacent memory. The corruption may be accidental and result in loss of data. However, the corruption can also be intentional or malicious and result in viruses and security concerns. Unlike program memory meant for program data whose locations are known in advance right after linking, heap memory locations are dynamically determined and not known until runtime. The techniques employed for identifying corruption of physical memory cannot be employed for heap memory because the physical memory utilized changes at runtime.

One technique for identifying corruption of heap memory is to employ conventional debugging breakpoint techniques. However, these techniques are difficult and time consuming to employ. Another technique is to rely on periodic evaluation of the heap memory. However, this may fail to identify corruption or only identify a subset of corruption of heap memory. Further, the periodic evaluations are performed on header sections and omit data sections. As a result, corruption of data sections can be missed. Even if periodic evaluation of the header sections and data is done by known means, such as CRC code comparisons, such evaluation requires significant CPU bandwidth. Thus, in order to maintain standards of performance, faster and more expensive hardware is needed. Further, such solutions have a bearing on bill of materials and increase power consumption. Yet another technique is to monitor function calls and identify calls that fall outside of permitted memory locations. However, this technique fails to check for overflows.

BRIEF DESCRIPTION OF THE DRAWINGS

FIG. 1A depicts example program code illustrating proper and improper heap memory accesses.

FIG. 1B depicts assembly language code illustrating proper and improper heap memory accesses.

FIG. 1C depicts example program code illustrating proper and improper pointer manipulation.

FIG. 1D depicts assembly language code illustrating improper pointer manipulation.

DETAILED DESCRIPTION OF THE INVENTION

Figure 2A:
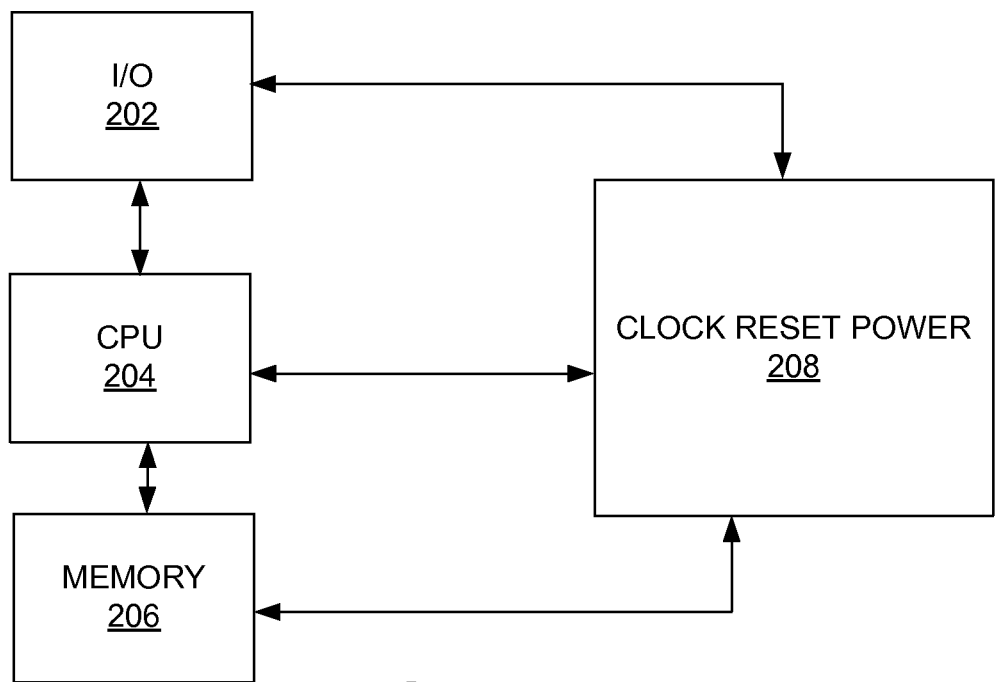
FIG. 2A is a block diagram illustrating an example computer system in which the invention can be implemented.

Disclosed herein are systems and methods for detecting heap memory overflow in memory based systems. In one embodiment, a heap overflow detection system includes an arithmetic logic unit, a datapath, and address violation detection logic. The arithmetic logic unit is configured to receive an instruction having an opcode and operands and to generate a final address and to generate a compare signal on the opcode indicating a heap memory access instruction. The datapath is configured to provide the opcode and the operands to the arithmetic logic unit. The address violation detection logic determines whether a heap memory access is a violation according to the operands and the final address on receiving the compare signal from the arithmetic logic unit. The heap memory access related instructions include memory access instructions, such as a STORE command, and pointer arithmetic instructions, such as arithmetic instructions for setting up addresses. In an alternate embodiment, the system also includes a trace buffer configured to receive the instruction or address of the instruction in the event of a violation. In another alternate embodiment, the address violation detection logic includes an address range file having entries for allocated heap memory blocks.

In another embodiment, a heap overflow detection system is disclosed. The system includes a compiler, program memory, a central processing unit (CPU) architecture and address register logic. The compiler is configured to compile a high level program, such as a program written in "C", into one or more machine instructions or codes according to policy constraints. The policy constraints can limit or restrict code related to pointer arithmetic operations. The program memory is configured to store one or more instructions. The CPU architecture is configured to fetch the one or more instructions from the program memory. Prior to run time execution, a portion of physical memory is reserved for heap memory. At run time, a need to dynamically obtain a block of memory causes memory allocation routines to be invoked that reserve a memory block of heap memory. The register logic comprises an address register, a size register, and a command register. The address register stores a base address for the memory block. The size register stores a size of the memory block. The command register stores an insert or remove command. The insert command corresponds to allocation of the memory block. The remove command corresponds to de-allocation or removal of the memory block. In an alternate embodiment, the system further comprises address violation detection logic that determines whether a heap memory access is a violation. The address violation detection logic inserts an entry into an address range file on the memory allocation request.

In yet another method of the invention, a method of detecting heap memory overflows is disclosed. A memory access related instruction is received. The instruction includes an opcode and operands. A compare signal is generated according to the opcode. The compare signal is generated on the opcode indicating a memory access or a memory address modification related instruction, such as a pointer arithmetic instruction. A final address is generated according to the memory access instruction along with the aforesaid compare signal. An entry in an address range file is identified according to a base address derived from the memory access instruction. The identified entry is compared with the final address to determine whether the heap memory access is a violation. In an alternate embodiment, a memory access or memory address modification related instruction is invoked and an entry corresponding to the memory allocation instruction is inserted into the address range file.

The present invention will now be described with reference to the attached drawing figures, wherein like reference numerals are used to refer to like elements throughout, and wherein the illustrated structures and devices are not necessarily drawn to scale.

The inventors of the present invention recognize that conventional solutions to identifying heap corruption are reactive in nature and can damage performance profiles. Further, heap corruption or inconsistencies may be detected long after corruption has occurred. Additionally, an offending instruction may be difficult to identify and require extensive debugging. Often, the root cause of the memory corruption or overflow is never found.

FIGS. 1A-1D include examples of program code to facilitate an understanding of the invention. FIG. 1A depicts example C program code illustrating proper heap memory access and a violation. Line 1 dynamically allocates a 20 byte size buffer or memory block from heap memory. It is noted that the terms memory block and buffer are interchangeable. The memory block is allocated a base address. Locations in the memory block are addressed by the base address and an offset. Here, the offset should be less than or equal to 20 in order to avoid corruption of other memory blocks. Line 2 illustrates a proper store operation, wherein an integer is written to the buffer at an offset of 15. The offset of the store operation is less than or equal to the size allocated for the memory block, 20, thus it does not result in an overflow condition. Line 3 illustrates an improper store operation, wherein an integer is written to the buffer or memory block at an offset of 42. This offset is greater than the allocated size of 20 and leads to corruption of adjacent blocks of memory if they have already been allocated.

FIG. 1B depicts the code example of FIG. 1A, after compilation in assembly language. Line 1 results in the address of variable Buffer being stored in register r0. In this example, the size is 20 and the variable Buffer holds the base address of the block of memory or buffer having a size of 20 bytes allocated by a memory allocator routine. To access any location belonging to this memory block, an offset to the desired location from the base address is required. This offset is either directly provided as a numeric value or passed to by means of a register to the store (STR) instruction. During the execution of a store instruction, an arithmetic logic unit (ALU) of a CPU is provided with both the base address and the offset as inputs and the ALU generates a final memory address as an output.

Line 2 results in the contents of the variable Buffer being stored in register r1. Line 3 results in integer 0x25 being stored in register r2. Line 4 results in the integer 0x25 being moved to an offset of 15 from the address stored in register r1. This does not result in an overflow condition or violation because the specified offset is within the size allocated for the memory block. Line 5 results in integer 0x35 being stored in register r2. Then, line 6 results in integer 0x35 being moved to an offset of 42 from the address stored in register r1, which yields an overflow condition or violation because the offset of 42 is greater than the allocated size/offset of 20. Line 6 results in data written outside the allocated memory block and can corrupt adjacent or nearby memory, if they have been allocated.

FIG. 1C depicts "C" program code of pointer manipulation. Line 1 dynamically allocates a 20 byte size buffer from the memory heap. Line 2 adds an offset of 35 to the address for variable Buffer, which will lead to a future violation because the variable Buffer is now pointing to an address outside the allocated memory block.

FIG. 1D depicts an assembly language equivalent version of the code from FIG. 1C. Line 1 results in the address of variable Buffer being stored in register r0. Line 2 results in the contents of address contained in register r0 being stored in register r1. Effectively, the address of the heap block is now available in register r1. Line 3 results in the addition of the base address of the heap block and an offset of value 35, leading to the final memory address being stored in register r1. Effectively, Line 3 sets a pointer to an address outside of the 20 byte range and can lead to future violations. The use of "ADD.A" instead of "ADD" identifies this as a memory access related instruction. Line 4 results in the contents of the register r1 being stored at the address held in register r0. Thus, the updated address of the heap block is stored back in variable buffer.

The inventor of the present invention recognizes that conventional debug and computer systems lack the ability to sufficiently monitor and check for overflows for heap memory access operations, such as load operations, store operations, and pointer arithmetic memory operations, during runtime. Further, it is recognized that final memory addresses calculated by an arithmetic logic unit (ALU) can be compared with a previously stored address range for a given base address to determine if the memory access violates the valid range of the base address.

FIG. 2A is a diagram of an example computer system in which the invention can be implemented. The system operates by a CPU 204 fetching instructions from memory 206 and executing the instructions. The CPU 204 also accesses the memory 206 to obtain data required for instruction execution or to update data as a result of instruction execution. It is appreciated that the example computer system is provided for illustrative purposes and that the present invention can be implemented in other suitable computer systems.

Figure 2B:
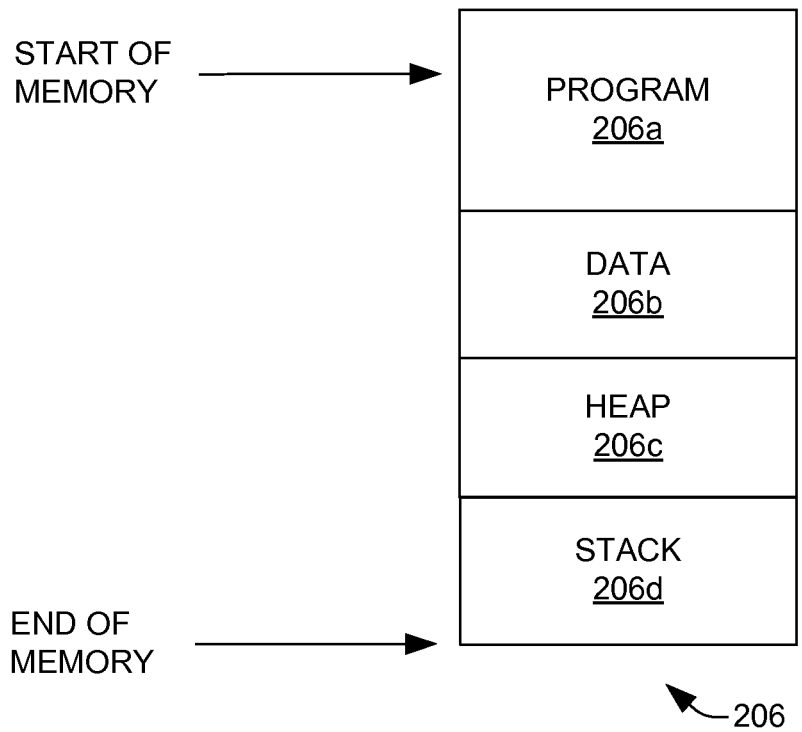
FIG. 2B is a block diagram illustrating a typical organization of memory which can be utilized with this invention.

FIG. 2B is a diagram illustrating a typical organization of memory 206 that can be implemented with the present invention. The memory 206 has a start of memory and an end of memory. Between the start and end of memory, there are four typical uses of memory in this organization, program memory 206a, data memory 206b, heap memory 206c and stack memory 206d. The program memory 206a contains the program instructions to be executed. The data memory 206b contains data elements which are known at compile time and before a program can execution. The data elements have assigned address. The heap memory 206c includes addresses to data elements that are only known while the program is running. The heap memory 206c may also be referred to as dynamic memory. The stack memory 206d is used to preserve the context of a procedure during nested procedure calls. It is also used to host local variables of active procedures that are not held in CPU registers. It is appreciated that other suitable memory organizations, employing heap memory or dynamic memory can be employed in accordance with the present invention.

Figure 2C:
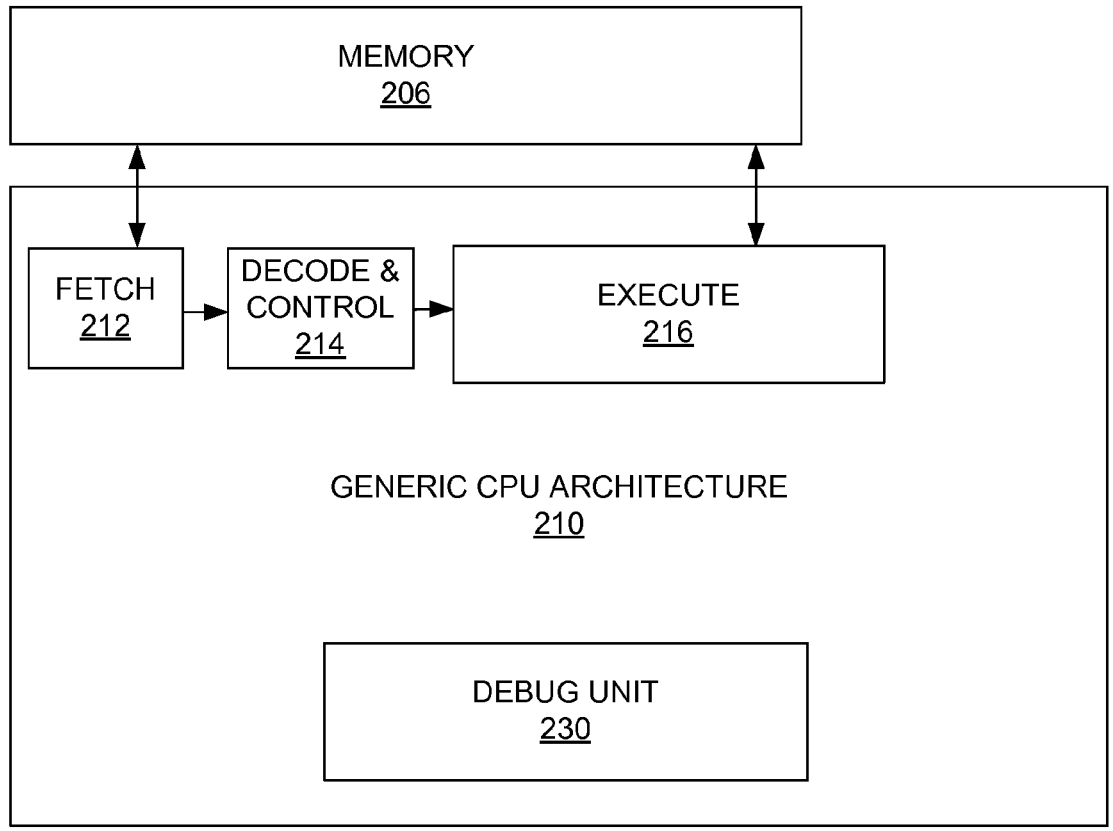
FIG. 2C is a block diagram of an example CPU architecture that can be utilized with embodiments of the invention.

FIG. 2C is a block diagram of a generic CPU architecture 210 with which embodiments of the invention can be implemented. The architecture 210 includes a memory 206 that includes program memory, data memory and heap memory. The architecture further includes a fetch unit 212, a decode and control unit 214, and an execute unit 216.

There are several fundamental tasks performed by CPU architectures, such as architecture 210. The architectures fetch instructions, decode instructions and fetch operands from registers, execution instructions, access memory, and write results back to the registers.

The memory 206 comprises one or more types of memory including heap or dynamic memory. The memory 206 may also include other types of memory, including, but not limited to data memory, program memory and stack memory. The memory 206 can be organized as shown in FIG. 2B or in other suitable memory arrangements that include heap memory.

Here, the fetch unit 212 fetches instructions from the memory 206. The instructions are fetched according to memory addresses stored specified by a program counter. The program counter includes a memory address for a next instruction. The memory address identifies a location in the memory 206 where the next instruction is located. Generally, a current fetched instruction is stored in an instruction register (not shown).

The instructions include at least one opcode and at least one operand. The opcode specifies a type of operation and what to perform. Some examples include add, sub, store, load, jump, and the like. The operand identifies data to be manipulated or operated on and may include addressing modes.

The decode and control unit 214 interprets or decodes the instructions and fetches the operands from a register unit and activates relevant portions of a datapath. The decode and control unit 214 obtains the opcode and the operand from the current instruction.

The execute unit 216 performs operations on the operands received from the decode unit 214 based on the opcodes of the instructions. The information from the decode unit 214 can be in the form of control signals to relevant units and to perform actions required by the instructions, such as reading values from registers, passing values for mathematical or logic functions, writing results to registers, and the like. Results generated by the instructions can be stored in memory or sent to an output device. Typically, the program counter is updated or incremented after execution of the current instruction.

The debug logic 230 includes infrastructure such as breakpoint handling, watchpoints, halting, and tracing functionality to examine and modify CPU context and to trace sequences of execution.

It is appreciated that the architecture 210 is provided for illustrative purposes and that other suitable architectures, with or without pipelines, can be employed with the present invention.

Figure 2D:
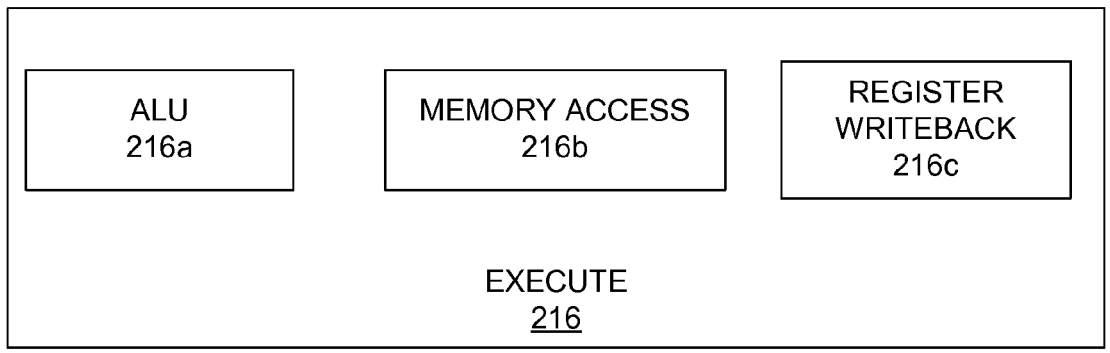
FIG. 2D is a block diagram of an example execution unit that can be utilized with embodiments of the invention.

FIG. 2D is a block diagram of a generic execute unit 216 with which embodiments of the invention can be implemented. The execute unit 216 is an example of a suitable unit that can be employed with FIG. 2C and the present invention. The execute unit 216 is provided as an example and it is appreciated that other similar units can be utilized in accordance with the invention. The execute unit 216 includes an arithmetic logic unit 216a, a memory access unit 216b, and a register writeback unit 216c. It is noted that the above units are logical functional units and may be implemented in one or more hardware units.

The arithmetic logic unit 216a performs arithmetic and logical operations on the operand and generates an output and a compare signal. The memory access unit 216b is hardware used to access memory 206 and is utilized for memory related instructions, including memory access related instructions, such as load and store instructions. The register unit 216c controls and performs register writing operations, i.e., storing to registers.

The ALU output can be written to a register for non-memory access and non-program control related instructions. For program control related instructions, a program counter may be updated or incremented with the ALU output, such as a jump instruction. In the case of memory access instructions, either data from an operand is stored at a memory location indicated by the ALU output, or data from the memory locations is read and stored in a register. Control signals trigger the memory access unit 216b to read (in case of a load) or write (in case of a store) from/to physical memory.

Figure 3:
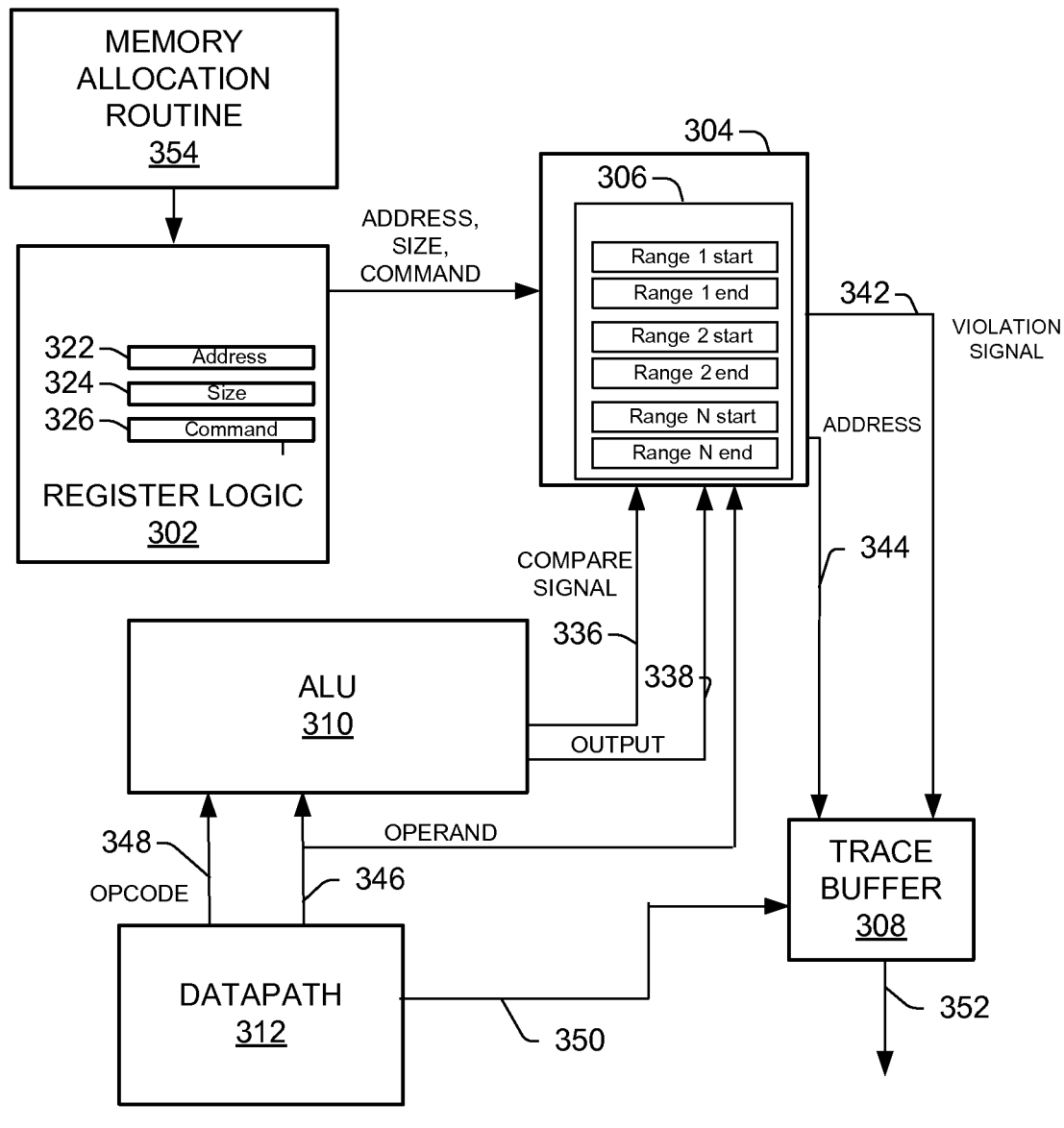
FIG. 3 is a block diagram illustrating a heap overflow detection system in accordance with an embodiment of the invention.

FIG. 3 is a block diagram illustrating a heap overflow detection system 300 in accordance with an embodiment of the invention. The system 300 tracks allocated heap memory blocks and detects heap memory corruption, also referred to as overflow errors or heap memory violations. More specifically, the system 300 identifies memory access related violations for load, store, and pointer arithmetic instructions. The system 300 includes debug register logic 302, address violation detection logic 304, an address range file 306, a trace buffer 308, an arithmetic logic unit (ALU) 310, and a datapath 312. It is appreciated that other components, not shown, may be present in the system 300. It is also appreciated that one or more of the listed components may be omitted or modified in alternate embodiments of the system 300.

The register logic 302 handles the allocation and removal of memory blocks of heap memory from the address range file. For memory allocation operations, the register logic 302 obtains a base address, size, and a command for a memory block and stores these in an address register 322, a size register 324, and a command register 326. The base address is an address location in heap memory. The size is a number of bytes for the memory block. The command is either to insert details of an allocated heap block into the address range file 306 or to remove from address range file 306 a previously inserted entry of a memory block or buffer. The register logic provides these values to the address violation detection logic 304.

The address violation detection logic 304 includes an address range file 306 that includes entries for allocated heap memory blocks. Each entry has a range of address from a base or start address to an end address that is determined by the specified size. In one example, the entries are pairs of memory addresses corresponding to start and ending addresses for an allocated memory block. The entries can be organized in a list, stack, or other suitable data structure.

Entries are created on insert commands received from the register logic 302 along with base addresses and sizes. The address violation detection logic 304 sets a range start as the base address and calculates a range end from the base address and corresponding size for the memory block. Entries are removed on remove commands received from the register logic 302.

The address violation detection logic 304 also receives a compare signal 336 and an ALU output 338 from the ALU 310. Also, the address violation detection logic 304 receives an operand 346 from the datapath 312. The compare signal 336 indicates that the address violation detection logic is to check a heap memory access for a violation. The ALU output is a final address for the memory access and is calculated by the ALU 310. The operand 346 includes an original base address or a modified base address as a result of pointer/address manipulation and is used by the address violation detection logic 304 to identify a range file entry or pair from the address range file 306 and determine whether the final address falls within the identified range. If the final address is within the range for the identified entry, there is no violation. If the final address is outside the range for the identified entry, there is a violation. A violation signal 342 and the identified violated base address (either original or modified) 344 are sent to the trace buffer 308.

The ALU 310 receives an opcode 348, the operand 346, and may receive one or more additional operands from the datapath 312. The opcode 348 specifies the operation to be performed. The operand 346 and the additional operands specify base addresses and offsets that point to memory locations. If the opcode 348 specifies an operation that involves memory access, such as a load, store, or pointer arithmetic, the ALU 310 sends the compare signal 336 to the address violation detection logic 304. The compare signal 336 informs the address violation detection logic 304 that a memory access operation is to be checked. An entry or absence of an entry in the address range file 306 determines whether the memory access is heap memory access. The ALU 310 calculates the final address from the operand 346 and the additional operands and provides the final address as the output 338 to the address violation detection logic 304.

The trace buffer 308 receives the violation signal 342 and the identified violated base address 344 from the address violation detection logic 304 in the event of a heap memory access violation. The trace buffer 308 may also receive or derive other related information 350 from the datapath 312 or elsewhere, such as the program counter that resulted in the violation. The program counter is a register (not shown) that contains a program counter value, which is an address of an instruction that has just been fetched. For pipelined architectures, the program counter value is adjusted due to the pipeline. If a violation is detected, the program counter value can be traced out. The program counter value, once recovered, is searched for in a symbol lookup table of the program being executed. The symbol table is contained in a symbol file or map file and contains addresses of data and program procedures. As a result, the program counter value can be utilized to indicate which procedure was involved in the violation. Thus, the above information including the program counter value, the procedure involved in the violation, and the identified violated heap address can be provided as an output 352.

The datapath 312 provides routes for data to travel between functional units. The datapath 312 is a logical concept with distributed physical implementation. It includes path(s) taken by operand data (either extracted directly from instruction or from register file) all the way to ALU 310 or memory access unit. It is also includes path(s) taken to write ALU output, results or data loaded from memory back to the cpu register file.

Figure 4:
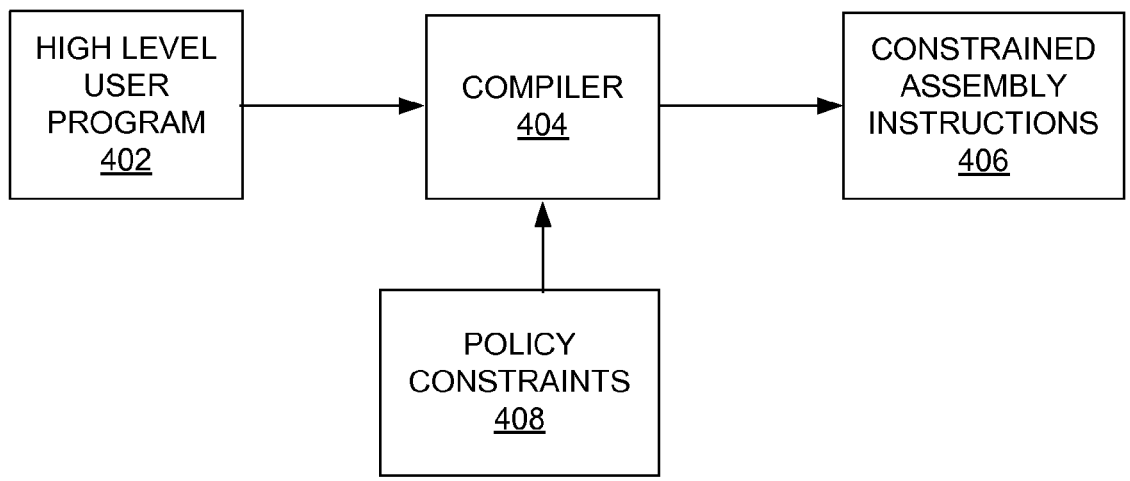
FIG. 4 is a block diagram illustrating a compiler system in accordance with an embodiment of the present invention.

FIG. 4 is a block diagram illustrating a compiler system 400 in accordance with an embodiment of the present invention. The compiler system 400 converts program code from a high level language, such as "C" to machine code. In order for the system 300 to perform properly, constraints in the compilation process are required for helping system 300 identify memory access related instructions from the rest of the instructions available as part of the instruction set.

The compiler system 400 includes a high level user program 402, such as a program written in C. The system 400 further includes a compiler 404, policy constraints 408, and constrained machine instructions 406. The high level program does not require special code or modification in order to work with the system 300. However, on compilation, the compiler 404 utilizes policy constraints 408 in order to generate constrained machine instructions 406 that are operable with a heap overflow detection system, such as system 300 of FIG. 3.

The policy constraints 408 require the compiler to use only specific instructions while dealing with memory access related calculations, such as pointer arithmetic for memory addresses. For example, the constraints could prohibit an "ADD" instruction from being utilized with an address and instead require a memory specific instruction, such as "ADD.A", when a memory address is being manipulated. It is noted that "ADD" and "ADD.A" are merely examples of assembly instructions. The constraints 408 make it easier for the ALU to identify the instruction as a memory related instruction and assert the compare signal.

The constraints 408 generally apply to CPU architectures with instruction sets that include arithmetic instructions that have at lease one of their operands assigned to contain only memory addresses. Instruction sets of such architectures may additionally include arithmetic instructions whose operands do not necessarily need to contain memory addresses, but are capable of containing memory addresses. Such constraints, when applied, reduce the amount of hardware logic required by the ALU to include in order for the ALU to decide if the compare signal should be asserted. In the absence of such constraints, the ALU requires additional hardware to determine whether to assert the compare signal. This is because the ALU is compelled to construe all arithmetic instructions as having one of their operands containing a memory address. It is appreciated that alternate embodiments of the invention can utilize additional hardware to handle more generic arithmetic instructions and not require the policy constraints 408.

Figure 5:
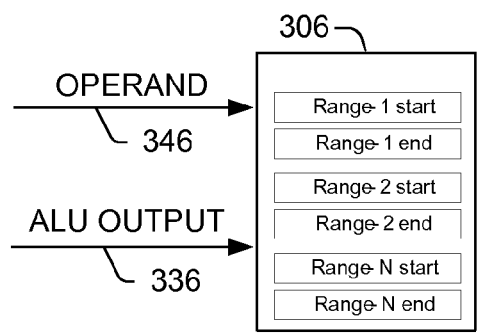
FIG. 5 is a block diagram further illustrating the address range file for a heap overflow detection system in accordance with an embodiment of the invention.

FIG. 5 is a block diagram further illustrating the address range file 306 of system 300. As stated above, the address range file 306 includes entries for allocated heap memory blocks. Each entry specifies a range of memory addresses from a start address to an end address. Entries are added in response to memory allocation requests, as insert commands along with a base address and size. Entries are removed on remove commands, along with a base address.

During operation and in response to the compare signal, the operand, which includes a base address, is utilized to select an entry in the range file 306. The range file 306 includes a list of entries that are searched to identify a matching entry. An entry is matched or identified if the base address lies within a range of addresses for that entry. In one example, the base address matches a starting address of an entry. In another example, the base address matches an address within the range of addresses for an entry, but not the starting address for the entry. If there is no match, then the base address references a non-heap memory location, such as a stack or data memory and a check is not performed. If there is a match, the ALU output is utilized to determine if a calculated final address is within the range of memory address for the identified or matched entry. The ALU output is essentially a calculated final base address.

Figure 6A:
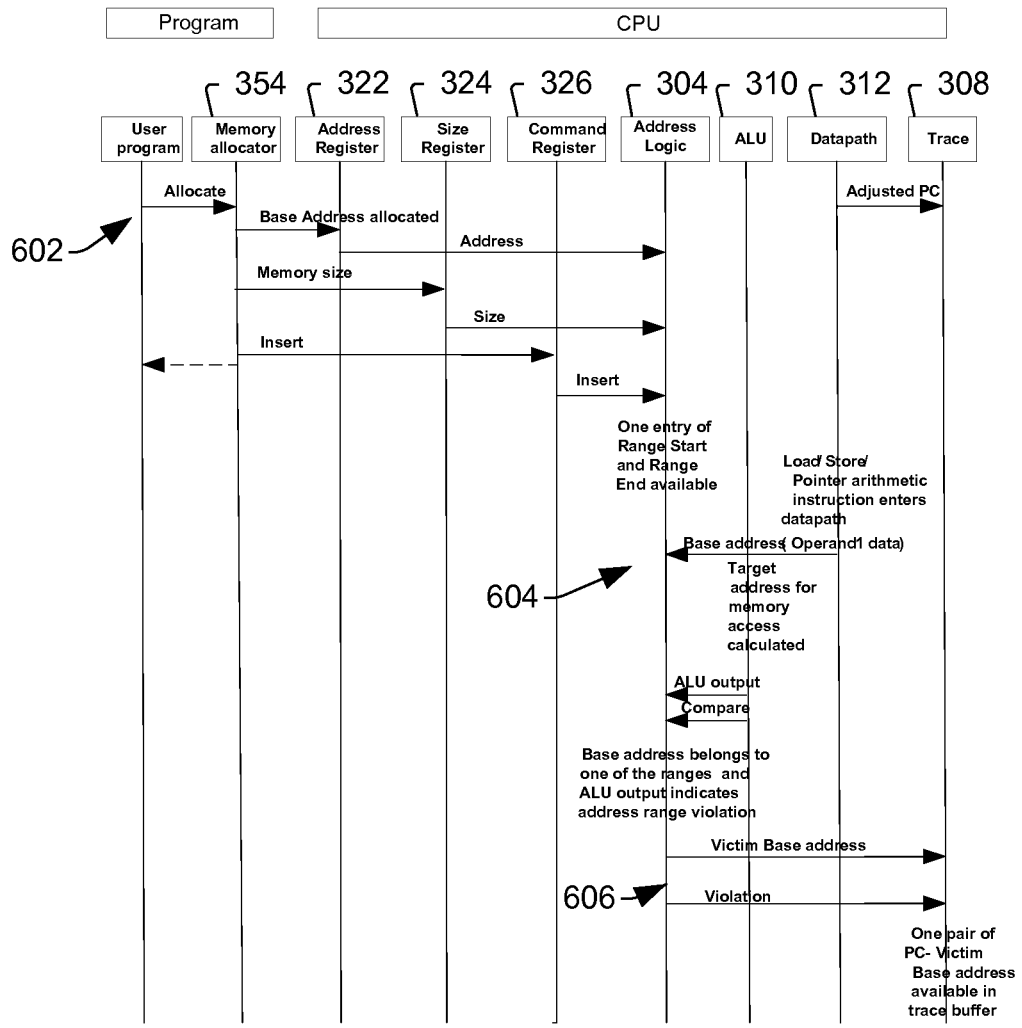
FIG. 6A is a diagram depicting an example of a run time execution utilizing a heap overflow detection system wherein a heap memory access violation is detected.

FIGS. 6A-6D illustrate various run time examples utilizing a heap overflow detection system and reference the system 300 of FIG. 3 as an example of a suitable system in accordance with the present invention. FIG. 6A is a diagram depicting an example of a run time execution utilizing a heap overflow detection system in accordance with the present invention. In this example, a overflow or memory access violation is detected.

Initially, at 602, a user program requests allocation of a buffer or block of heap memory. A memory allocator 354 allocates a block of heap memory and identifies allocation information including a base address, a memory size, and an insert command for the allocated block of heap memory. The base address, the memory size and the insert command are then passed to the corresponding address register 322, size register 324, and command register 326 of the register logic 302 by the memory allocator 354. The base address, size, and insert command are then sent from the register logic 302 to the address violation detection logic 304, which creates an entry in the range file 306. Thus, the address range file 306 now has an entry for the allocated block of heap memory.

At 604, a load, store, or pointer arithmetic instruction enters the datapath 312. The operand, opcode, and one or more additional operands are provided to the ALU 310, which determines a final base address and provides it as an ALU output. The ALU also identifies that the instructions is a load, store, or pointer arithmetic instruction and sends a compare signal to the address violation detection logic. Further, the operand, shown as operand1 in FIG. 6A, specifies a base address and is utilized by the address violation detection logic to identify an entry in the range file 306. In this example, the base address matches the entry created at 602.

At 606, the address violation detection logic 306 compares the final address with the range for the identified address to determine whether the final address is within the allocated range for that memory block. If the final address is outside the range for the identified entry, then a violation has occurred. Violation related information, such as an adjusted program counter, and the violated base address, is provided to the trace buffer 308 for further action.

Figure 6B:
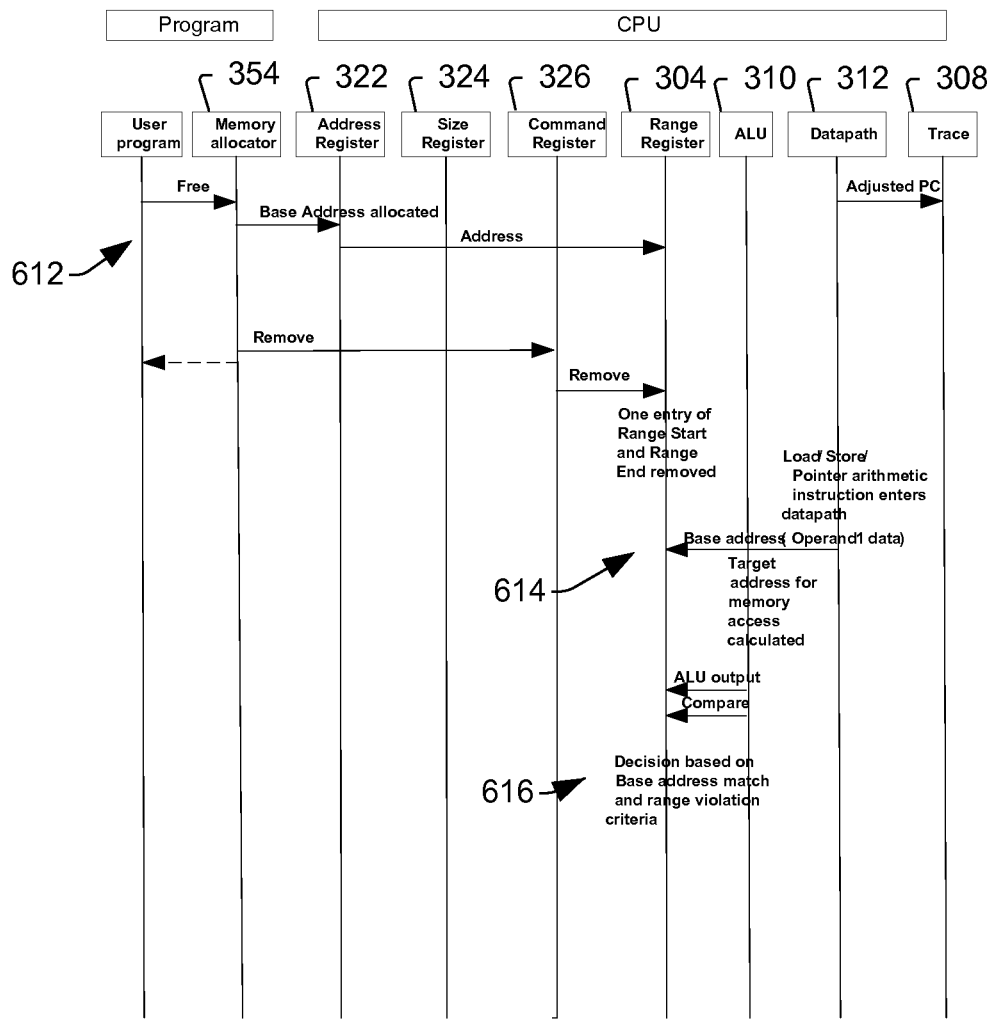
FIG. 6B is a diagram depicting an example of a run time execution utilizing a heap overflow detection system wherein an entry is removed from an address range file.

FIG. 6B is a diagram depicting an example of a run time execution utilizing a heap overflow detection system in accordance with the present invention. In this example, an entry is removed from the address range file 306.

Initially, at 612, a user program requests a buffer or block of heap memory be de-allocated or freed. A memory allocator 354 de-allocates the block of heap memory according to the specified base address. Additionally, the base address and a remove command are passed by the memory allocator 354 to the corresponding address register 322 and command register 326 of the register logic 302 which in turn passes the received details to the address violation detection logic. The address violation detection logic 304, then identifies an entry in an address range file 306 and removes the entry.

At 614, a load, store, or pointer arithmetic instruction enters the datapath 312. The operand, opcode, and additional operands are provided to the ALU 310, which determines a final base address and provides it as an ALU output. The ALU also identifies that the instructions is a load, store, or pointer arithmetic instruction and sends a compare signal to the address violation detection logic. Further, the operand specifies a base address and is utilized by the address violation detection logic to identify an entry in the range file 306. In this example, a matching entry is not found and, as a result, there is no violation. At 616, there is no violation so nothing is provided to the trace buffer.

Figure 6C:
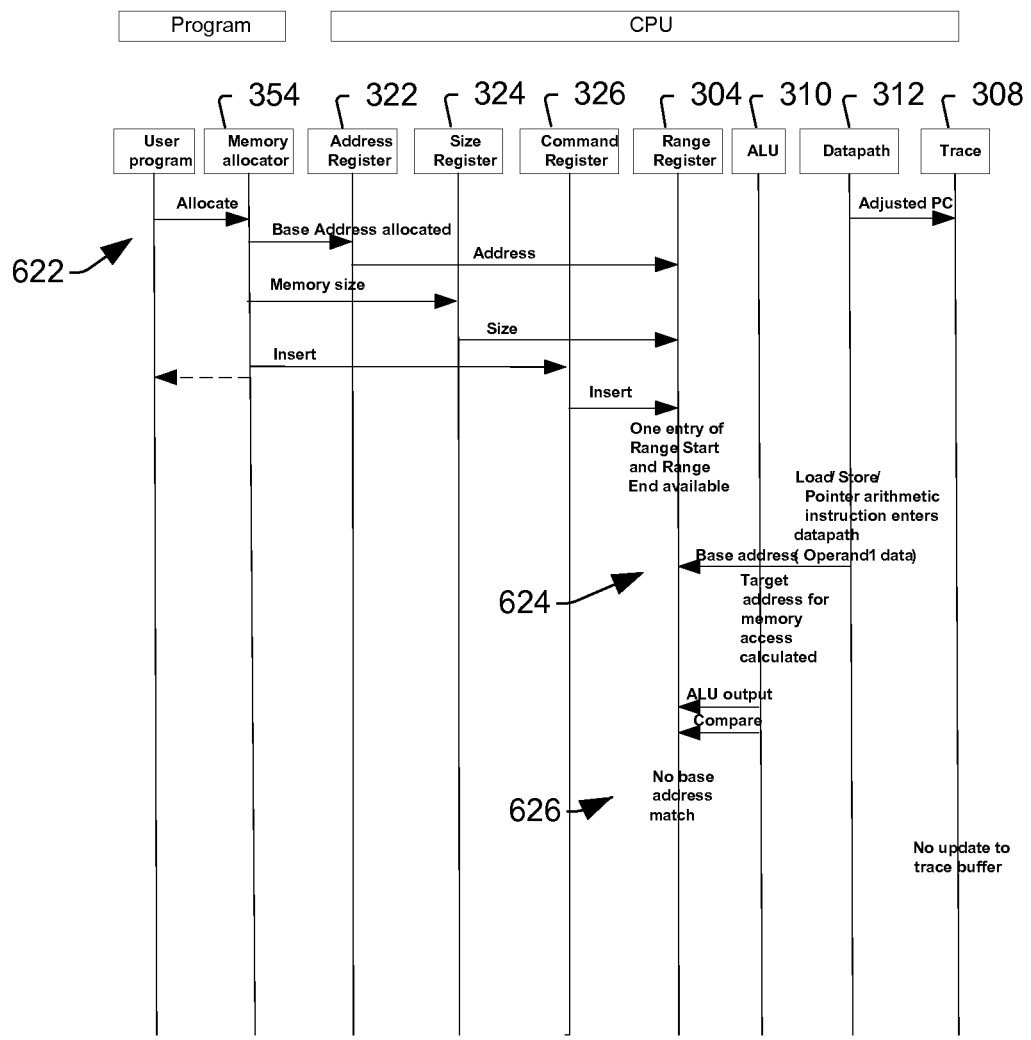
FIG. 6C is a diagram depicting an example of a run time execution utilizing a heap overflow detection system wherein a memory access is determined to not be of heap memory.

FIG. 6C is a diagram depicting yet another example of a run time execution utilizing a heap overflow detection system in accordance with the present invention. In this example, the system determines that the base address references a non-heap memory location and, as a result, there is no overflow or memory access violation of heap memory.

Initially, at 622, a user program requests a buffer or block of heap memory. A memory allocator identifies a base address, a memory size, and generates an insert command. The base address, the memory size and the insert command are then passed to the corresponding address register 322, size register 324, and command register 326 of the register logic 302. The base address, size, and insert command are then sent from the register logic 302 to the address violation detection logic 304, which creates an entry in the range file 306.

At 624, a load, store, or pointer arithmetic instruction enters the datapath 312. The operand, opcode, and additional operands are provided to the ALU 310, which determines a final base address and provides it as an ALU output. The ALU also identifies that the instructions is a load, store, or pointer arithmetic instruction and sends a compare signal to the address violation detection logic. Further, the operand specifies a base address and is utilized by the address violation detection logic 304 to identify an entry in the range file 306. Here, the base address is not the base address for the allocated block of heap memory at 622.

At 626, the address violation detection logic 304 determines that the base address does not correspond to an entry in the address range file 306. Thus, the base address points to a non-heap memory location. No information is provided to the trace buffer 308.

Figure 6D:
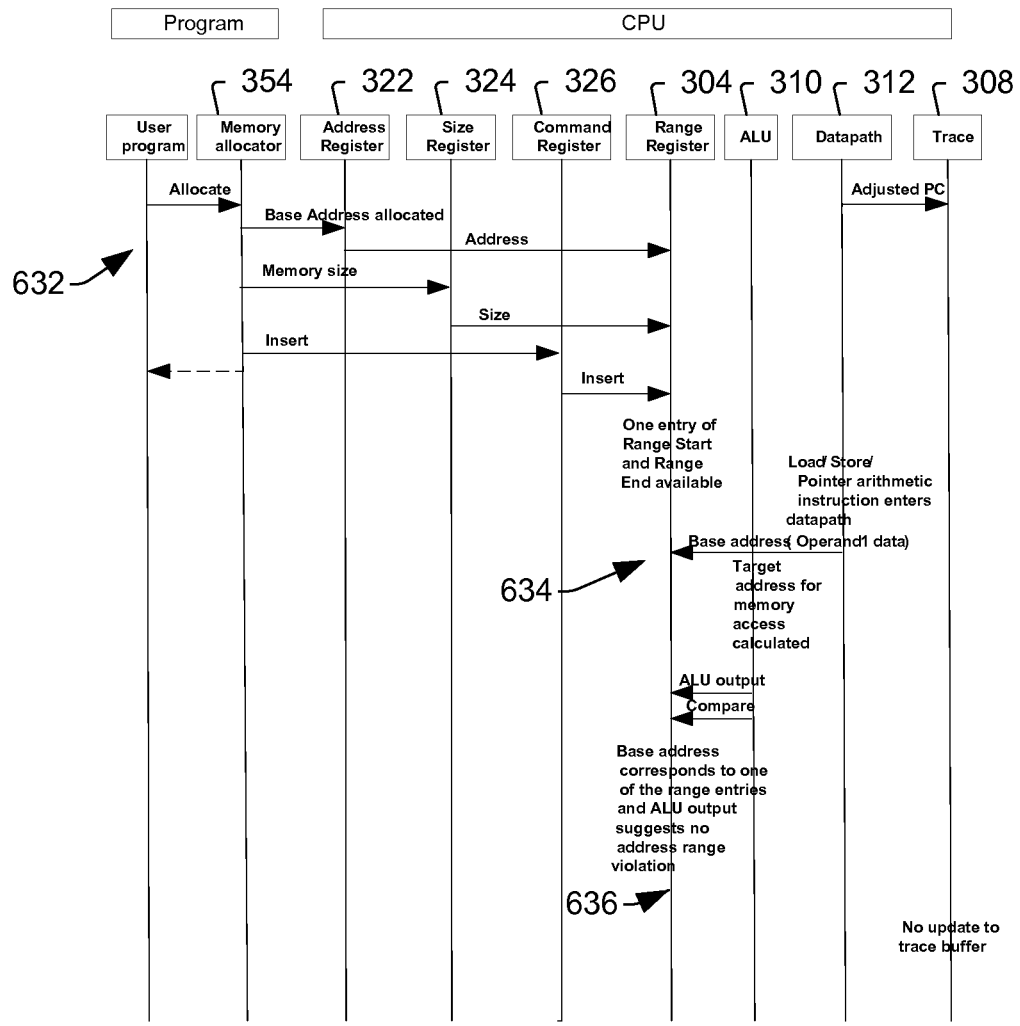
FIG. 6D is a diagram depicting an example of a run time execution utilizing a heap overflow detection system wherein a proper heap memory access occurs and no violation is detected.

FIG. 6D is a diagram depicting another example of a run time execution utilizing a heap overflow detection system in accordance with the present invention. In this example, the system identifies an address as referencing heap memory and determines that an overflow or memory access violation has not occurred. In other words, a valid heap memory access has occurred.

Initially, at 632, a user program requests a buffer or block of heap memory. A memory allocator unit identifies a base address, a memory size, and generates an insert command. The base address, the memory size and the insert command are then passed to the corresponding address register 322, size register 324, and command register 326 of the register logic 302. The base address, size, and insert command are then referenced by the address violation detection logic 304, which creates an entry in the range file 306.

At 634, a load, store, or pointer arithmetic instruction enters the the datapath 312. The operand, opcode, and additional operands are provided to the ALU 310, which determines a final base address and provides it as an ALU output. The ALU 310 also identifies that the instructions is a load, store, or pointer arithmetic instruction and sends a compare signal to the address violation detection logic. Further, the operand specifies a base address and is utilized by the address violation detection logic 304 to identify an entry in the range file 306.

At 636, the address violation detection logic 304 determines that the base address correspond to an entry in the address range file 306. The address violation detection logic compares the ALU output with the range for the identified entry from the address range file 306 and determines that there is no violation. Because there is no violation, no information is provided to the trace buffer 308.

Figure 7:
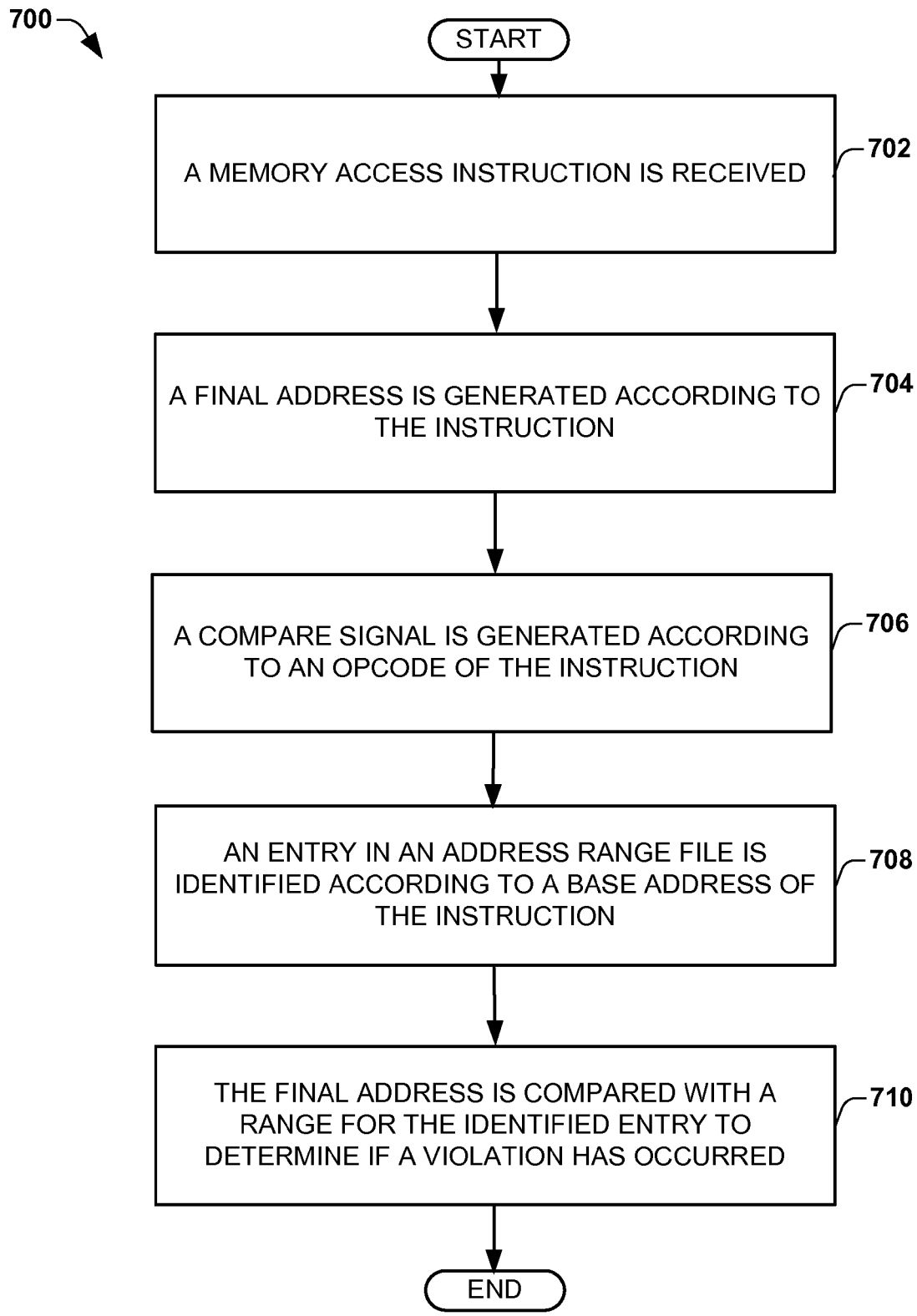
FIG. 7 is a flow diagram illustrating a method of detecting heap memory overflow in accordance with an embodiment of the invention.

FIG. 7 is a flow diagram illustrating a method 700 of detecting heap memory overflow in accordance with an embodiment of the invention. The method 700 is shown occurring in an order, however it is appreciated that blocks of the method 700 can be performed in other suitable orders. Further, it is appreciated that the method 700 can be performed with or without the embodiments described supra.

The method begins at block 702, wherein a memory access related instruction is received. The instruction includes an opcode and an operand and can include one or more additional operands. The operand includes a base address and the one or more additional operands can include offsets or other information. In one example, the memory access related instruction is fetched by processor architecture, such as architecture 210 of FIG. 2C and decoded and executed.

A final address is generated according to the memory access related instruction at block 704. The final address is generated by an arithmetic logic unit as a function of the operand and the one or more additional operands present in the memory access operation. In one example, the one or more additional operands include an offset from a base address for a store command. In another, the one or more operands specify arithmetic scaling for a pointer location.

A compare signal is generated at block 706 according to the opcode. The opcode identifies a memory access related operation, such as a load, store, or pointer arithmetic. If the opcode does not specify a memory access related instruction, the method 700 ends for the current instruction and a compare signal is not generated. Generally, the compare signal is generated after or together with the ALU output because the address violation detection logic starts to perform its function on receiving the compare signal. If no compare signal is provided, the address violation detection logic can merely ignore the ALU output.

An entry in an address range file is identified according to a base address derived from the memory access instruction at block 708. The entry is identified or matched by searching a list of entries within the address range file. An entry is identified or matched if the base address lies within a range of addresses for that entry. The base address can merely be the operand. In one example, the base address corresponds to a start address of an allocated heap memory block. In another example, the base address or operand corresponds to a modified start address resulting from a previously carried out pointer manipulation If no entry in the address range file is identified for the base address, the base address can be assumed to not address a heap memory block and no violation of heap memory access is identified. The identified entry specifies a range of addresses for an assigned heap memory block or buffer. In one example, address violation detection logic references the address range file to identify the corresponding entry.

The final address is compared with the identified entry at block 710 to determine if a violation of heap memory access has occurred. If the final address falls within the range of addresses for the identified entry, no violation of heap memory has occurred. However, if the final address falls outside the range of addresses for the identified entry, a violation has occurred. Information including, but not limited to, the base address, and the program counter can be sent to a trace buffer or the like to further aid in debugging operations.

Heap memory entries are added to the address range file on memory allocation by a memory allocator. The entries are created according to architecture allocated addresses and requested sizes. Heap memory entries are removed from the address range file on memory removal or de-allocation requests to memory allocator. Here, the memory removal request specifies the base or starting address for the entry, which identifies the entry and is subsequently removed.

Although the invention has been illustrated and described with respect to one or more implementations, alterations and/or modifications may be made to the illustrated examples without departing from the spirit and scope of the appended claims.

Furthermore, although the invention is described herein in relation to processor architectures and memory organizations, it will be appreciated that other architectures, memory organizations, and the like can be utilized with embodiments of the inventions.

Moreover, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A heap overflow detection system comprising:
an arithmetic logic unit configured to receive an instruction having an opcode and an operand and to generate a final address and to generate a compare signal on the opcode indicating a heap memory access related instruction;
a datapath configured to provide the opcode and the operand to the arithmetic logic unit; and
address violation detection logic that determines whether a heap memory access is a violation according to the operand and the final address on receiving the compare signal from the arithmetic logic unit.

2. The system of claim 1, further comprising a trace buffer configured to provide information related to an identified violation.

3. The system of claim 2, wherein the trace buffer is further configured to receive a program counter from the datapath in the event of the violation.

4. The system of claim 1, wherein the operand specifies a base address of an allocated heap memory block.

5. The system of claim 1, wherein the instruction further comprises one or more additional operands.

6. The system of claim 5, wherein the final address is generated as a function of the operand and the one or more additional operands.

7. The system of claim 1, wherein the address violation detection logic includes an address range file having entries for allocated heap memory blocks.

8. The system of claim 7, wherein each entry in the address range file has a range of addresses from a base address to an end address.

9. The system of claim 8, wherein the base address and the end address correspond to an allocated memory block of a specified size.

10. The system of claim 9, wherein the address violation detection logic identifies an entry from the address range file according to the operand and compares the final address to a range of the identified entry to determine whether the heap memory access instruction is a violation.

11. The system of claim 10, wherein the address violation detection logic inserts an entry into the address range file on receiving an insert command and a base address and size for an allocated memory block.

12. The system of claim 11, further comprising register logic comprising an address register, size register, and a command register for storing the insert command, the base address and the size and providing the insert command, the base address and the size to the address violation detection logic.

13. A heap overflow detection system comprising:
   a compiler configured to compile a high level program into one or more instructions according to policy constraints;
   program memory configured to store the one or more instructions;
   a processor architecture configured to fetch the one or more instructions from the program memory
   a memory allocator configured to allocate memory blocks of heap memory on memory allocation requests; and
   register logic comprising an address register, size register, and a command register for storing a command, a base address and a size on the memory allocation instruction of a memory block of the heap memory.

14. The system of claim 13, wherein the policy constraints limits the type of instructions that can be used for pointer arithmetic.

15. The system of claim 13, further comprising address violation detection logic that determines whether a heap memory access instruction is a violation according to an operand and final address.

16. The system of claim 15, wherein the address violation detection logic inserts an entry into an address range file on the memory allocation instruction of a memory block of the heap memory utilizing the command, the base address, and the size from the register logic.

17. A method of detecting heap overflows, the method comprising:
   receiving a memory access related instruction having an opcode and an operand;
   generating a final address according to the memory access instruction;
   generating a compare signal according to the opcode;
   identifying an entry in an address range file according to a base address derived from the memory access related instruction; and
   comparing the identified entry with the final address to determine whether the heap memory access is a violation.

18. The method of claim 17, further comprising receiving a memory allocation instruction and inserting an entry into the address range file.

19. The method of claim 17, further comprising receiving a memory de-allocation instruction and removing an entry from the address range file.

20. The method of claim 17, further comprising providing the base address, and a program counter value to a trace buffer.

* * * * *